United States Patent
Long et al.

(10) Patent No.: US 8,527,596 B2
(45) Date of Patent: Sep. 3, 2013

(54) SYSTEM AND METHOD FOR MONITORING ACTIVITY OF A SPECIFIED USER ON INTERNET-BASED SOCIAL NETWORKS

(75) Inventors: Kevin Long, West Lafayette, IN (US); Michael Howe, Plainfield, IN (US); Ellery Crane, Burlington, VT (US); Nicholas Husher, Montpelier, VT (US)

(73) Assignee: Youdiligence, LLC, Montpelier, VT (US)

( * ) Notice: Subject to any disclaimer, the term of this patent is extended or adjusted under 35 U.S.C. 154(b) by 0 days.

(21) Appl. No.: 12/942,473

(22) Filed: Nov. 9, 2010

(65) Prior Publication Data

US 2011/0113096 A1  May 12, 2011

Related U.S. Application Data

(60) Provisional application No. 61/259,982, filed on Nov. 10, 2009.

(51) Int. Cl.
*G06F 15/16* (2006.01)

(52) U.S. Cl.
USPC ............ 709/206; 709/204; 709/205; 709/207

(58) Field of Classification Search
USPC ................................................. 709/204–207
See application file for complete search history.

(56) References Cited

U.S. PATENT DOCUMENTS

| | | | | |
|---|---|---|---|---|
| 8,010,602 B2* | 8/2011 | Shen et al. | ..................... | 709/204 |
| 2005/0021750 A1* | 1/2005 | Abrams | .......................... | 709/225 |
| 2005/0235062 A1* | 10/2005 | Lunt et al. | ..................... | 709/225 |
| 2007/0005654 A1* | 1/2007 | Schachar et al. | ........... | 707/104.1 |
| 2007/0198503 A1* | 8/2007 | Hogue et al. | ....................... | 707/5 |
| 2008/0065701 A1* | 3/2008 | Lindstrom et al. | ............ | 707/201 |
| 2008/0162510 A1* | 7/2008 | Baio et al. | ...................... | 707/100 |
| 2008/0162692 A1* | 7/2008 | Schultz et al. | ................ | 709/224 |
| 2008/0188261 A1* | 8/2008 | Arnone | ........................ | 455/550.1 |
| 2008/0189380 A1 | 8/2008 | Bosworth et al. | | |
| 2008/0302867 A1* | 12/2008 | Holberg | ......................... | 235/375 |
| 2009/0043789 A1* | 2/2009 | Gupta | ........................... | 707/100 |
| 2009/0070334 A1 | 3/2009 | Callahan et al. | | |
| 2009/0089417 A1* | 4/2009 | Giffin et al. | .................... | 709/224 |
| 2009/0158430 A1 | 6/2009 | Borders | | |
| 2009/0217342 A1 | 8/2009 | Nadler | | |
| 2009/0265233 A1* | 10/2009 | Sendo et al. | ..................... | 705/14 |
| 2009/0271287 A1* | 10/2009 | Halpern | .......................... | 705/26 |
| 2009/0282342 A1* | 11/2009 | Fabris et al. | ................... | 715/733 |
| 2010/0049852 A1* | 2/2010 | Whitnah et al. | ............... | 709/226 |
| 2010/0057859 A1* | 3/2010 | Shen et al. | ..................... | 709/206 |
| 2010/0082695 A1* | 4/2010 | Hardt | ............................ | 707/798 |
| 2010/0106752 A1* | 4/2010 | Eckardt et al. | ................ | 707/805 |
| 2010/0153175 A1* | 6/2010 | Pearson et al. | .................. | 705/10 |
| 2010/0306138 A1* | 12/2010 | Hotes et al. | ..................... | 706/12 |
| 2011/0029408 A1* | 2/2011 | Shusterman et al. | ........ | 705/27.1 |

OTHER PUBLICATIONS

International Search Report and Written Opinion issued in connection with PCT/US2010-055966 by the U.S. Searching Authority on Dec. 27, 2010.

* cited by examiner

*Primary Examiner* — Hieu Hoang
(74) *Attorney, Agent, or Firm* — Barnes & Thornburg LLP

(57) ABSTRACT

A system and method are provided for monitoring activity on an internet-based social network. Monitoring criteria is pre-established by a client for monitoring activity on a specified user's page of the social network. Activity monitoring access to the specified user's page of the internet-based social network is established via an application programming interface of the social network based on pre-established identification information that identifies the specified user within the internet-based social network. The client is notified when the monitored activity satisfies at least one of the pre-established monitoring criteria.

25 Claims, 5 Drawing Sheets

SYSTEM AND METHOD FOR MONITORING ACTIVITY OF A SPECIFIED USER ON INTERNET-BASED SOCIAL NETWORKS

CROSS-REFERENCE TO RELATED APPLICATION

This patent application claims priority to, and the benefit of, U.S. Patent Application Ser. No. 61/259,982, filed Nov. 10, 2009, the disclosure of which is incorporated herein by reference.

FIELD OF THE INVENTION

The present invention relates generally to internet-based social networks, and more specifically to a system and method for monitoring activity, such as content and/or other information, of specified users of such networks.

BACKGROUND

Internet-based social networks are commonplace and are used by many individuals worldwide to socialize with each other. It is desirable to be able to monitor the activity of certain users of one or more such social networks.

SUMMARY

The present invention may comprise one or more of the features recited in the attached claims, and/or one or more of the following features and combinations thereof. In one embodiment, a system is provided for monitoring activity on an internet-based social network. The system may comprise a client electronic device configured to receive information via an internet link, and a server. The server may include a memory having instructions stored therein that are executable by the server to monitor activity on a specified user's page or pages visited by the specified user of the social network based on pre-established monitoring criteria, and to send a notification to the client electronic device via the internet link when the monitored activity satisfies at least one criterion of the pre-established criteria. The memory may further have instructions stored therein that are executable by the server to establish activity monitoring access to the specified user's page of the internet-based social network via an application programming interface of the social network based on pre-established identification information that identifies the specified user within the internet-based social network.

The client electronic device may comprise, for example, one or more of a personal computer (PC), laptop PC, notebook PC, Tablet PC, Smartbook, Ultra-Mobile PC, Handheld PC, personal data or digital assistant (PDA), wireless mobile device and a smart phone.

The internet-based social network may be, for example, one or more of Facebook®, MySpace®, LinkedIn®, Twitter®, YouTube®, Flickr®, Nexopia, Bebo, Hi5, StudiVZ, iWiW, Tuenti, Decayenne, Tagged, XING, Badoo, Skyrock, Orkut, Hi5, Friendster, Mixi, Multiply, Orkut, Wretch, Xiaonei, Cyworld and Areapal.

The memory may further have instructions stored therein that are executable by the server to receive as data input one or more specified monitoring criterion, and to use the one or more specified monitoring criterion as the pre-established monitoring criteria.

The instructions that are executable by the server to monitor activity on a specified user's page of the internet-based social network based on pre-established monitoring criteria may include instructions to monitor activity on the specified user's page for occurrences on the specified user's page of one or more specified words. The instructions that are executable by the server to monitor activity on a specified user's page of the internet-based social network based on pre-established monitoring criteria may include instructions to monitor activity on the specified user's page for occurrences on the specified user's page of one or more specified phrases. The instructions that are executable by the server to monitor activity on a specified user's page of the internet-based social network based on pre-established monitoring criteria may include instructions to monitor activity on the specified user's page for occurrences on the specified user's page of one or more specified authors of words or phrases that appear on the specified user's page.

The specified user's page of the internet-based social network may comprise a number of sub-pages. The instructions that are executable by the server to monitor activity on a specified user's page of the internet-based social network based on pre-established monitoring criteria may include instructions to monitor activity on the specified user's page for occurrences on one or more specified ones of the specified user's sub-pages of at least one of one or more specified words, phrases and authors of words or phrase that appear on the one or more specified user' subpages.

The instructions that are executable by the server to monitor activity on a specified user's page of the internet-based social network based on pre-established monitoring criteria may include instructions to monitor activity on the specified user's page for occurrences of one or more friend requests made by the specified user.

The instructions that are executable by the server to monitor activity on a specified user's page of the internet-based social network based on pre-established monitoring criteria may include instructions to monitor activity on the specified user's page for occurrences of one or more friend acceptances made by the specified user.

The instructions that are executable by the server to monitor activity on a specified user's page of the internet-based social network based on pre-established monitoring criteria may include instructions to monitor activity on the specified user's page for occurrences of one or more friend requests sent by another to the specified user's page.

The instructions that are executable by the server to monitor activity on a specified user's page of the internet-based social network based on pre-established monitoring criteria may include instructions to monitor activity on the specified user's page for occurrences of words or phrases on the specified user's page indicating that another user has accepted the specified user as a friend in response to a friend request made by the specified user.

The instructions that are executable by the server to monitor activity on a specified user's page of the internet-based social network based on pre-established monitoring criteria may include instructions to monitor activity on the specified user's page for occurrences of words or phrases on the specified user's page indicating that the specified user has joined a social group within the social network.

The instructions that are executable by the server to monitor activity on a specified user's page of the internet-based social network based on pre-established monitoring criteria may include instructions to monitor activity on the specified user's page for occurrences of words or phrases on the specified user's page indicating that the specified user has participated in one of a game, a contest and a survey made available to users of the social network.

The instructions that are executable by the server to monitor activity on a specified user's page of the internet-based social network based on pre-established monitoring criteria may include instructions to monitor activity on the specified user's page for occurrences of words or phrases on the specified user's page indicative of one or more searches conducted by the specified user for other users of the social network or social groups within the social network.

The memory may have instructions stored therein that are executable by the server to receive as data input one or more specified notification receiving methods, and to use the one or more specified notification receiving methods to send the notification to the client electronic device. The one or more specified notification receiving methods may include any of a client-accessible web page, e-mail, Short or Silent Messaging Service (SMS), Wireless Application Protocol (WAP), and Really Simple Syndication or Rich Site Summary (RSS) web feed format.

The instructions that are executable by the server to monitor activity on a specified user's page of the internet-based social network based on pre-established monitoring criteria may further include instructions to produce a report of the monitored activity on a client-accessible web page. The instructions that are executable by the server to monitor activity on a specified user's page of the internet-based social network based on pre-established monitoring criteria further include instructions to provide on the client-accessible web page a hyperlink to a $3^{rd}$ party person information search application for investigation of authors of words or phrases on the specified user's page made other than by the specified user.

The memory may have instructions stored therein that are executable by the server to receive as data input one or more identification items specific to the specified user within the internet-based social network, and to use the one or more identification items as the pre-established identification information. In one embodiment, the one or more identification items may include at least one of the specified user's name and a social network identification number or code assigned to the specified user by the internet-based social network. The instructions that are executable by the server may include instructions to establish activity monitoring access to the specified user's page of the internet-based social network via a publicly available application programming interface feed of the social network based on the pre-established identification information if the one or more identification items are publicly available. Alternatively, the instructions that are executable by the server may include instructions to establish activity monitoring access to the specified user's page of the internet-based social network if the one or more identification items are not publicly available by requesting the specified user to install a software application internal to the internet-based social network that causes the internet-based social network to make activity on the specified user's page of the internet-based social network available to the client via the application programming interface feed of the social network based on the pre-established identification information.

The instructions that are executable by the server to monitor activity on a specified user's page of the internet-based social network based on pre-established monitoring criteria may include instructions to monitor activity on the specified user's page or pages visited by the specified user for occurrences on the specified user's page or pages visited by the user of content that matches at least one training set of content.

The instructions that are executable by the server to monitor activity on a specified user's page of the internet-based social network based on pre-established monitoring criteria may include instructions to produce a score or rating of the monitored activity on a client-accessible web page that compares occurrence activities of the specified user against at least one of the occurrence activities of the specified user over time and of the occurrence activities of at least one other specified user being monitored.

A method for monitoring activity on an internet-based social network may comprise pre-establishing monitoring criteria for monitoring activity on a specified user's page of the social network, establishing activity monitoring access to the specified user's page of the internet-based social network via an application programming interface of the social network based on pre-established identification information that identifies the specified user within the internet-based social network, and notifying a client when the monitored activity satisfies at least one of the pre-established monitoring criteria.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
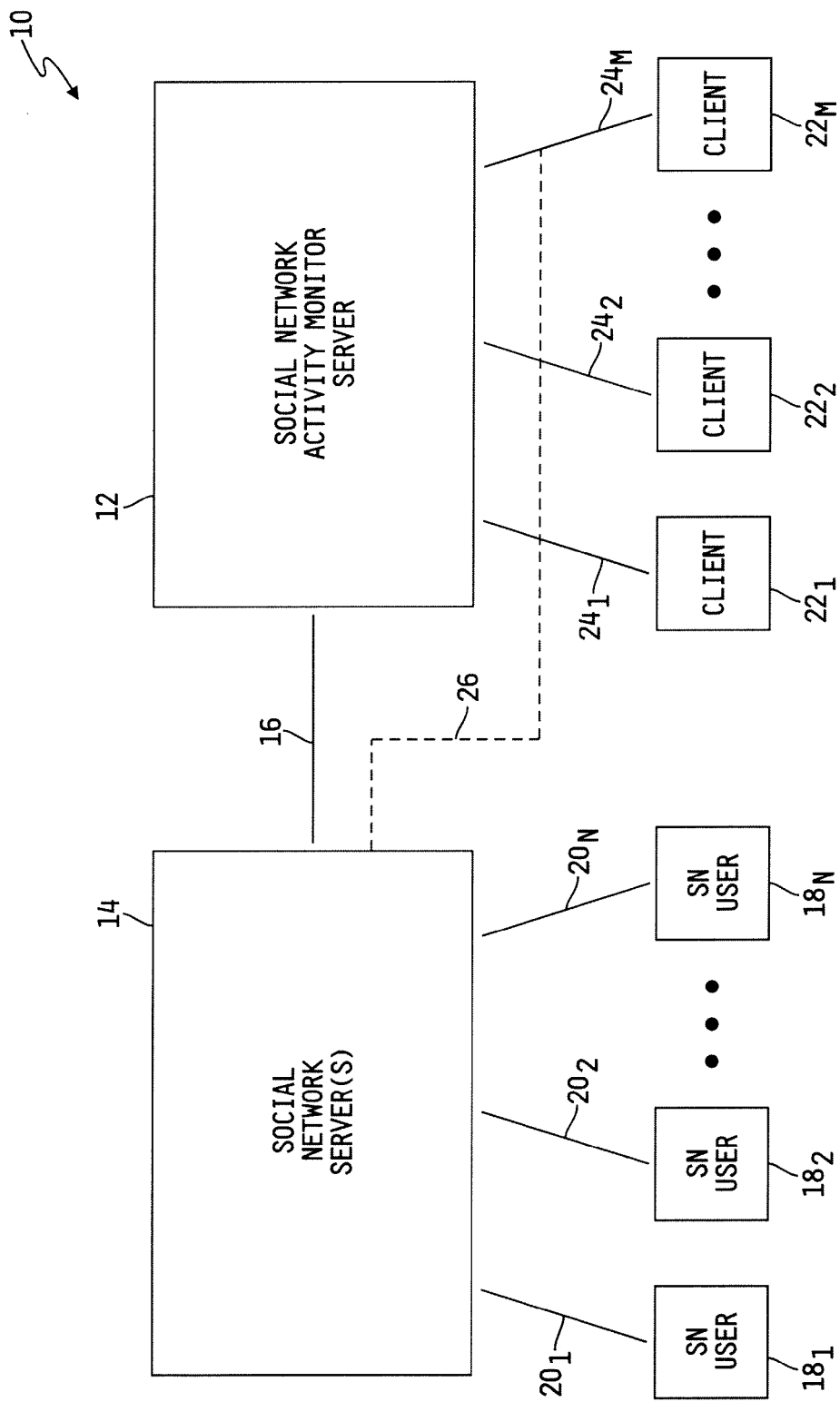
FIG. 1 is a diagram of one illustrative embodiment of a system for monitoring activity on internet-based social networks.

Referring now to FIG. 1, a diagram is shown of one illustrative embodiment of a system 10 for monitoring activity on internet-based social networks. In the illustrated embodiment, the system 10 includes an activity monitor server 12 that is configured to communicate with one or more internet-based social network servers and/or systems via a communication link 16. The communication link 16 illustratively represents an internet connection, such as via the World Wide Web (WWW) or other network, and may be wired, wireless or a combination thereof, and may involve the API of the internet-based social network.

The one or more social network servers 14 represent any number of servers or other computer-bases systems that host and control any number of social networks and/or social network websites. Examples of such social networks/websites include, but are not limited to, Facebook®, a global social networking website, MySpace®, a social networking website, LinkedIn®, a business-oriented social networking website, Twitter®, a social networking and micro-blogging service, YouTube®, a video sharing website, Flickr®, a video and image sharing and repository website, Nexopia, Bebo, Hi5, StudiVZ, iWiW, Tuenti, Decayenne, Tagged, XING, Badoo, Skyrock, Orkut, Hi5, Friendster, Mixi, Multiply, Orkut, Wretch, Xiaonei, Cyworld, Areapal and the like. In any case, such one or more internet-based social network services and/or websites are typically configured to allow any number, N, of users, $18_1$-$18_N$, to join and participate in social networking with each other, wherein N may be any positive integer.

Generally, the users $18_1$-$18_N$ may access the one or more social networks via a corresponding communication link $20_1$-$20_N$ established between a local computer-based device and the associated social network server 14. Examples of computer-based devices that users $18_1$-$18_N$ may use to access the one or more social network services include, but are not limited to, personal computers (PCs), laptop PCs, notebook PCs, Tablet PCs, Smartbooks, Ultra-Mobile PCs, Handheld PCs, personal data (or digital) assistants (PDAs), wireless mobile devices, smart phones, and the like that are capable of accessing the internet, e.g., WWW, or other network via which the one or more social networks communicate with the users $18_1$-$18_N$. In this regard, the communication links $20_1$-$20_N$ illustratively represent internet or other network connections that may be established between the one or more users $18_1$-$18_N$ and the one or more social network servers 14, which may be wired, wireless or a combination thereof.

The social network activity monitor server 12 is configured to allow any number, M, of clients, $22_1$-$22_M$, to join the social network monitoring service and monitor the activity of one or more specified users of one or more internet-based social networks, wherein M may be any positive integer. Generally, the clients $22_1$-$22_M$ may access the social network monitoring service via a corresponding communication link $24_1$-$24_M$ established between a local computer-based device and the social network activity monitor server 12. Examples of computer-based devices that clients $22_1$-$22_M$ may use to access the social network activity monitor service or to be accessed by the social network activity monitor service include, but are not limited to, personal computers (PCs), laptop PCs, notebook PCs, Tablet PCs, Smartbooks, Ultra-Mobile PCs, Handheld PCs, personal data (or digital) assistants (PDAs), wireless mobile devices, smart phones, and the like that are generally capable of accessing the internet, e.g., WWW, or other network via which the social network activity monitor server is configured to communicate with clients. In this regard, the communication links $24_1$-$24_M$ illustratively represent internet or other network connections that may be established between the one or more clients $22_1$-$22_M$ and the social network activity monitor server 12, which may be wired, wireless or a combination thereof.

It will be understood that while the social network activity monitor service detailed herein will be described as being executed by a social network activity monitor server 12 configured to communicate with one or more social network servers 14, this disclosure alternatively contemplates embodiments in which the social network activity monitor service is executed in whole or in part by one or more of the internet-based social network servers 14. In such embodiments, the one or more social network servers 14 communicate directly with the clients $22_1$-$22_M$ via a communication link 26 illustrated in FIG. 1 by dashed-line representation. In other alternative embodiments, the social network activity monitor service detailed herein may be, in whole or in part, a "cloud" application, wherein the term "cloud" refers to the conventional term "cloud computing" in which application execution is carried by a server owned and/or operated by a $3^{rd}$ party provider accessible via the internet or "cloud." In general, "cloud computing" customers do not require physical infrastructure for executing and managing software applications and services, but rather purchase, rent or otherwise obtain computing power from $3^{rd}$ party providers via the internet.

Figure 2:
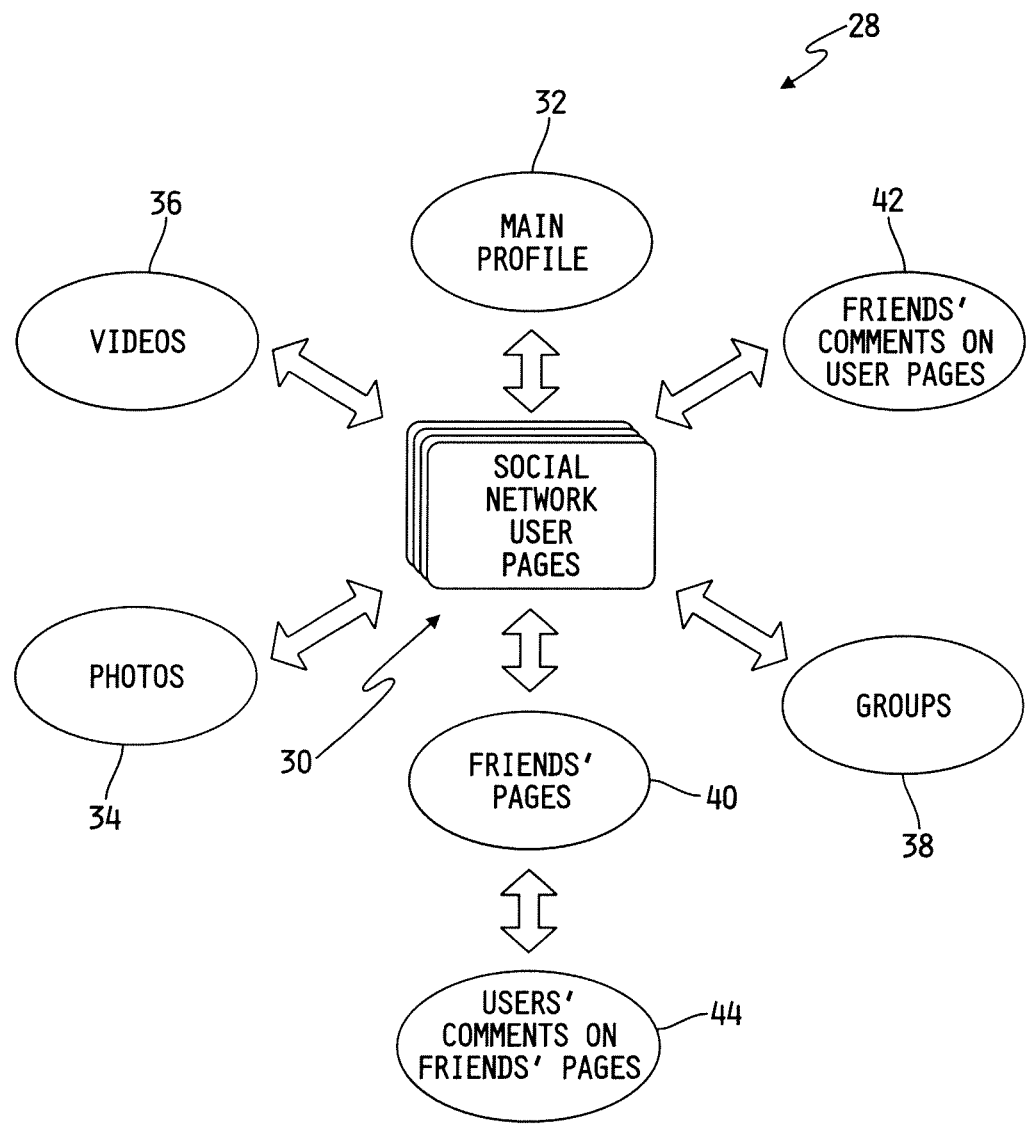
FIG. 2 is a diagram of one example of a format of an internet-based social network illustrating some of the content typically associated with such networks.

Referring now to FIG. 2, a diagram is shown of one example format of an internet-based social network service 28 illustrating some of the content typically associated with such network services. In the illustrated embodiment, the social network service 28 provides for many social network user "pages" 30, wherein a separate page is assigned to each new user that joins the social network. Each user page may have several sub-pages that may be accessed by the user, and examples of such sub-pages may include, but are not limited to, a main profile page 32, a photos page, a videos page, a groups page, a friends page 40, a private messaging page, a home page, and the like. The main profile page 32 may include, for example, information about the user such as place of work, educational institutions attended, marital status, birth date, one or more user e-mail addresses and other personal information. The main profile page 32 will typically include a photo uploaded by the user and identified by the user as the user's profile photo. It is the user's profile photo that is displayed to other users of the social network regardless of whether other users have access to other information contained on the user's page.

The photos page 34 typically includes one or more photos that have been uploaded by the user, and may further include photos uploaded by other users in which the user has been "tagged," i.e., identified by name. The photos page 34 may also include a comment field for each photo that allows other users having access to the user's page to enter written comments. The videos page 36 may be as described with respect to the photos page 34. The groups page 38 may contain a list of social network-based groups that the user has initiated or joined. The friends page 40 may contain a list, with graphical content, e.g., a profile photo, of "friends" of the user. A "friend" is generally a status given to other users by the user to allow such other users access to otherwise private or access-restricted sub-pages of the user's social network page, such as photos, profile information and the like.

Friends of the user may make written comments on various aspects of the content of the user's page, such as photos, videos and other sub-pages. Additionally, friends may communicate and converse with the user via an instant messaging feature. Further still, certain information written by friends on their own pages may be displayed on the user's page such as, for example, when friends enter written comments about themselves, about other topics, upload photos tagging the user, etc. All such data is identified in FIG. 2 as friends' comments on users' pages 42. Likewise, the user may make comments as just described on their friends' pages, and such data is identified in FIG. 2 as users' comments on friends' pages 44.

Figure 3:
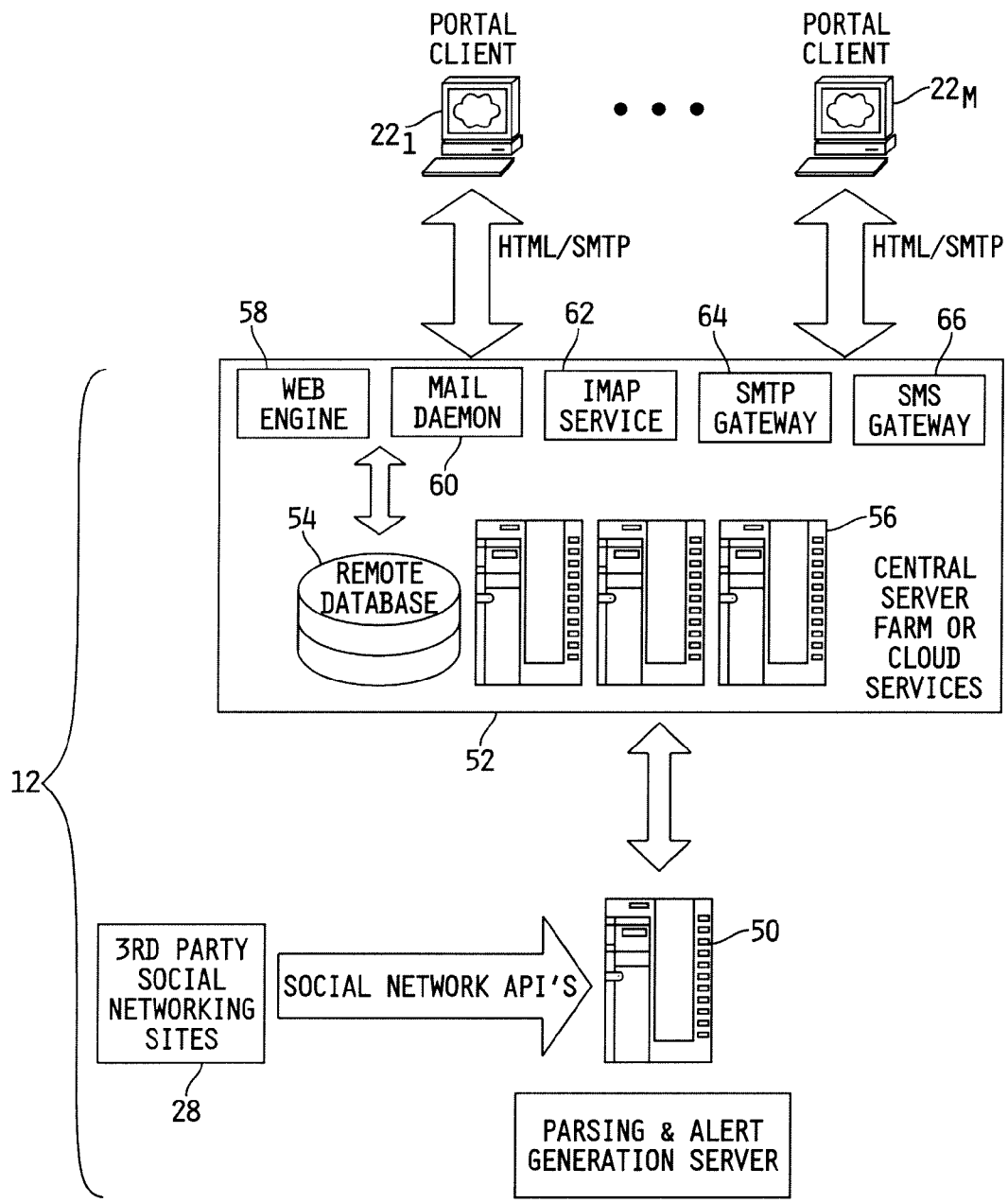
FIG. 3 is a diagram of one illustrative embodiment of the activity monitor server shown in FIG. 1.

Referring now to FIG. 3, a diagram is shown of one illustrative embodiment of the social network activity monitor server 12 illustrated in FIG. 1. In the illustrated embodiment, a parsing and alert generation server 50 is configured to access the one or more internet-based social network services specified by the clients $22_1$-$22_M$ via the application programming interfaces (APIs) of the one or more internet-based social networks, and to then parse pages of such social network services that have been authorized by the clients $22_1$-$22_M$ and to gather information that meets criteria selected and defined by the clients $22_1$-$22_M$. The parsing and alert generation server passes all information retrieved from the social network users' pages to a central server farm 52 which contains a database 54 and a number of data processing server units 56. The central server farm 52 also includes a conventional web engine 58, a conventional mail daemon 60, a conventional Internet Message Access Protocol (IMAP) service 62, a conventional Simple Mail Transfer Protocol (SMTP) gateway 64 and a Short or Silent Messaging Service (SMS) gateway 66. The central server farm 52 further includes a Hyper Text Markup Language (HTML) and/or SMTP interface connectable to and/or accessible by, the various clients $22_1$-$22_M$. The central server farm 52 is configured to notify or alert clients $22_1$-$22_M$ of social network activity that satisfies criteria selected by the clients $22_1$-$22_M$ via one or more conventional communication methods, examples of which include, but should not be limited to, web-based communication, e-mail, Short or Silent Messaging Service (SMS), Wireless Application Protocol (WAP), Really Simple Syndication or Rich Site Summary (RSS) web feed format, and the like.

The social network activity monitoring service executed by the social network activity monitor server 12 allows clients $20_1$-$20_M$ to monitor social network activity of one or more specified users of one or more internet-based social networks on the specified user's page and/or on pages visited by the specified user via the internet-based social network. Such social network monitoring may serve one or more purposes, examples of which include, but are not limited to, any one or more of assisting in management of the reputations of social network users, generally protecting social network users from undesirable information written by or about users by early detection and suitable disciplinary or other measures, protecting social network users from accepting undesirable individuals as friends, protecting social network users from requesting to be friends of undesirable individuals, and the like. The social network activity monitoring server 12 illustrated in FIG. 3 provides this service by monitoring and analyzing the content and connected data relating to all social network activity of a user specified by a client, and by providing resulting statistical data to the client in one or more formats selected by the client. The social network activity monitoring service continually filters large quantities of social network content, and provides to clients relevant grouping and analysis of social network activity of one or more social network users specified by the clients. As described briefly hereinabove, the server 12 may in some alternative embodiments be, or be included in, in whole or in part, the social network server(s) 14 or a so-called cloud service. As one specific example, which should not be considered to be limiting in any way, this disclosure contemplates alternate embodiments in which the parsing and alert generation server 50 is as shown in FIG. 3, but the central farm server farm 52 is included in the social network server(s) 14 or is a so-called cloud service such that the operation of the central server farm 52 is controlled by one or more $3^{rd}$ party servers via the internet.

Figure 4:
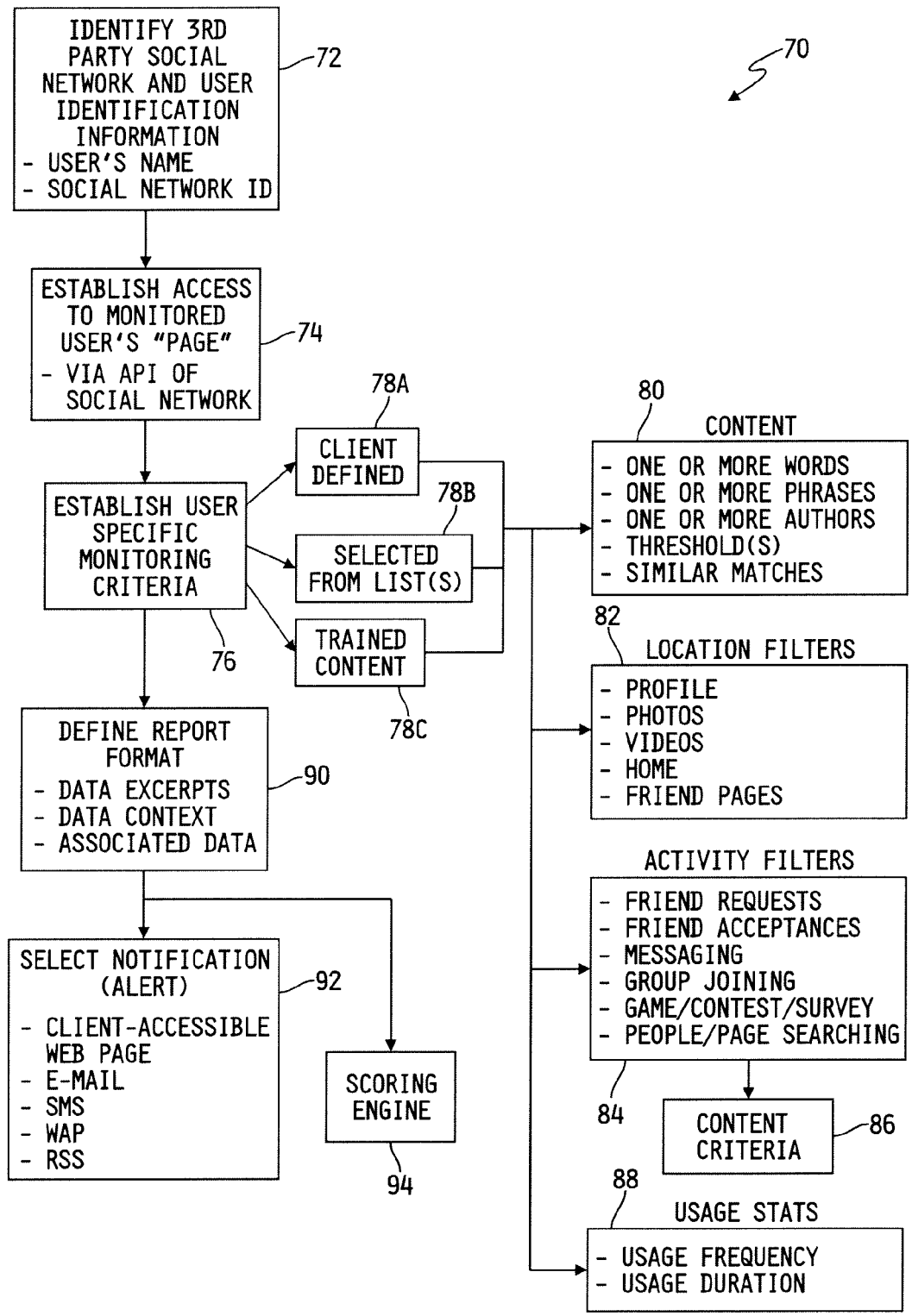
FIG. 4 is a flowchart of one illustrative embodiment of a process executed by the system of FIGS. 1 and 3 for establishing activity monitoring criteria of a specified user of an internet-based social network by a client of the internet-based social network monitoring system.

Referring now to FIG. 4, a flowchart is shown of one illustrative embodiment of a process 70 that is executable by the social network activity monitor server 12 of FIGS. 1 and 3 for establishing activity monitoring criteria of a specified user of an internet-based social network by a client of the internet-based social network monitoring service. The process 70 is illustratively stored in the database 54 of the central server farm 52 of the social network activity monitor server 12 in the form of instructions that are executable by the data processing servers 56 to carry out the functional features of the process 70 as will be described hereinafter.

In the illustrated embodiment, the process 70 begins at step 72 where the client identifies and specifies a $3^{rd}$ party social network and user identification information that identifies the specified user within the social network who's activity on the social network the client desired to monitor. Illustratively, the specified user may be one over whom the client has legal supervisory authority, e.g., as a parent or guardian. Alternatively or additionally, the specified user may be one over whom the client has other supervisory authority, e.g., scholastic, sports, and/or other organization. Alternatively or additionally still, the specified user may be anyone who's social network activity the client desires to monitor and to who's social network access information the client has access. The $3^{rd}$ party social network is illustratively an internet-based social network service or website of which a user specified by the client is a member. The user identification information that identifies the specified user within the specified social network will generally be the specified user's name and/or social network identification number or code (ID) assigned to the specified user in the specified social network.

From step 72, the process 70 advances to step 74 where the client establishes user monitoring access to the specified user's page in the selected social network. In one embodiment, where the specified user's identification information is publicly available, the client stores the specified user's name and/or social network ID within the social network activity monitor server 12 which, when used by the social network monitoring service along with the publicly available API feed from the internet-based social network, provides monitoring access by the social network activity monitor server 12 to the specified user's page within the specified social network. In alternative embodiments in which the specified user's identification information is not publicly available, the client may establish monitoring access to the specified user's page in the selected social network by first obtaining and storing within the social network activity monitor server 12 the specified user's name and/or social network ID assigned to the specified user by the specified social network, and then requesting the specified user to install a software application internal to the specified social network or otherwise ensuring that such a software application is installed. The software application will typically be provided to the specified user or otherwise made available to the specified user by the social network activity monitor server 12 at the request of the client. This software application, when executed by the specified social network server, makes available to the client via the API of the social network site any content relating to activity on the specified user's page that the client may wish to monitor. Various examples of such activity, which should not be considered to be limiting in any way, are illustrated and described herein.

The process 70 advances from step 74 to step 76 where the client establishes user specific monitoring criteria; that is, the client establishes information monitoring criteria that is specific to the specified user. It will be understood that different clients may desire to monitor different social network user activity generally, and may further desire to monitor different social network activity even as between different users and/or different social networks that the client desires to monitor. The information monitoring criteria established at step 76 may thus be specifically tailored by the client for each user who's social network activity the client desires to monitor and/or may be further tailored differently for each social network that the client desired to monitor. In any case, step 76 may branch to any one or more of steps 78A-78C where the client may define the user monitoring criteria and/or may select pre-defined monitoring criteria from a pre-established list of criteria and/or may select a content training set as a monitoring criteria. As an example of the pre-established list of criteria, the social network activity monitor service may, for example, maintain one or more lists of words and/or phrases commonly monitored by others. Each such pre-established list may, for example, be specific to a different group of users, e.g., different by age, gender, geographic location, group, club or organization to which the specified user belongs, or the like. In any case, the client may at step 78A define all user monitoring criteria, and/or at step 78B the client may select one or more pre-established user monitoring criteria from one or more sets or lists of pre-established user monitoring criteria, and/or at step 78C the client may select a content training set as a monitoring criteria. Illustratively, the training set of previously tagged information items may be selected by the user from a pre-existing content training set or may be pre-specified by the user, such as through manual input of such items and/or selection of such pre-existing items or lists of items made available by the social network activity monitor service. The social network activity monitor server 12 may then in the subsequent activity monitoring of the specified user execute a corresponding classification algorithm that identifies threat levels of the monitored activity based on the similarity of the monitored content to one or more pre-established monitoring criteria.

From step 78A, 78B and/or 78C, the process 70 advances to step 80 where the content of user activity to be monitored is established, i.e., specifically defined by the client or selected as part of a pre-established set or list of content to be monitored or selected as part of a pre-established training/classification process in which the system identifies content that matches content within one or more training sets. The content may be or include, for example, one or more specific words, one or more specific phrases, one or more specific authors, i.e., names of "friends" whose comments may appear on the specified user's page, and the like, or it may include a match (or matches) with one or more training sets of content. Subsequent detection by the social network monitor service of any such word, phrase or author will cause the social network monitor service to generate and send to the client a corresponding alert identifying detection of the word, phrase or author in the specified user's social network activity.

One or more thresholds may also be established for any of the monitored content at step 80 such that an alert will be generated only if a threshold has been exceeded. One or more thresholds may be or include frequency and/or duration components. For example, a threshold may be established such that an alert is generated and sent to the client if a specific word, phrase or author occurs more than J times, where J may be any integer. As another example, a threshold may be established such that an alert is generated and sent to the client if the specific word, phrase or author occurs more than J times over a K hour, day, week or month time period, where J and K may each be any integer. One or more thresholds may additionally or alternatively include a severity component. For example, a threshold may be established such that an alert is generated and sent to the client only if a specific word, phrase or author occurs within a specified number of words, phrases or authors of another specific word, phrase or author, whereas an alert may not otherwise be generated in the absence of such a combination. Other threshold types and definitions will occur to those skilled in the art, and such other threshold types and definitions are contemplated by this disclosure.

From any of steps 78A-78C, the process 70 also advances to step 82 where one or more location filters may be established to define one or more corresponding locations, i.e., sub-pages, within the specified user's "page" where content or activity is to be monitored or not monitored. Examples of such sub-pages may include, but should not be limited to, the specified user's profile page, photos page, videos page, home page, friend page or pages, or the like. For example, a client may desire to monitor only a specified user's photo page, and may accordingly set a location filter to monitor only social network activity associated with the specified user's photos page. As another example, a client may desire to monitor all social network activity except that which occurs on the specified user's profile page, and may accordingly set a location filter to monitor social network activity on all but the specified user's profile page. In any case, subsequent detection by the social network monitor service of any established word, phrase or author on any of the specified user's page locations identified by a location filter or not specifically excluded by a location filter will cause the social network monitor service to generate and send to the client a corresponding alert identifying detection of the word, phrase or author in the specified user's social network activity. Other location filter types and definitions will occur to those skilled in the art, and such other location filter types and definitions are contemplated by this disclosure.

From any of steps 78A-78C, the process 70 also advances to step 84 where one or more activity filters may be established to define specific activities that may occur on the specified user's page that the client desires to monitor or to specifically not monitor. Examples of such activity occurrences a client may desire to monitor or specifically not monitor may include, but should not be limited to, words or phrases on the specified user's page indicating that friend requests have been sent to the specified user by one or more other users of the social network, words or phrases on the specified user's page indicating friend acceptances that have been made by the specified user in response to friend requests sent to the specified user by one or more other users of the social network, words or phrases on the specified user's page indicating friend requests that have been made by the specified user to other users of the social network, words or phrases on the specified user's page indicating that friend acceptances have made by other users of the social network in response to friend requests made by the specified user, messaging that may occur between the specified user and others, words or phrases on the specified user's page indicating joining of social groups within the social network by the specified user, words or phrases on the specified user's page indicating games, contests and/or surveys made available to users of the social network and in which the specified user participates within the social network, words or phrases on the specified user's page indicative of one or more searches conducted by the specified user for other users of the social network and/or social groups within the social network, and the like. Subsequent detection by the social network monitor service of the occurrence of any activity identified by an activity filter will cause the social network monitor service to generate and send to the client a corresponding alert identifying the activity. Other activity filter types and definitions will occur to those skilled in the art, and such other activity filter types and definitions are contemplated by this disclosure.

In addition to the activity filters just discussed, one or more activity and/or content thresholds may also be established. For example, a frequency threshold may be set such that an alert is generated and sent to the client if a specified activity occurs more than J times, where J may be any integer. As another example, a frequency and duration threshold may be set such that an alert is generated and sent to the client if a specified activity occurs more than J times over a K hour, day, week or month time period, where J and K may each be any integer. As a further example, one or more thresholds may additionally or alternatively include a severity component. For example, a threshold may be established such that an alert is generated and sent to the client only if two or more specified activities occur, whereas an alert may not otherwise be generated in the absence of such a combination. Other threshold types and definitions will occur to those skilled in the art, and such other threshold types and definitions are contemplated by this disclosure.

Step 84 may also advance to step 86 where additional content criteria may be added to any one or more of the activity filters specified at step 84. For example, an existing activity filter may be modified at step 86 such that an alert is generated and sent to the client only if a specified activity occurs that includes specified content such as in the form of one or more specified words, phrases and/or authors, whereas an alert may not otherwise be generated in the absence of such a condition.

From any of steps 78A-78C, the process 70 also advances to step 88 where one or more usage statistics may be established to define specific social network usage categories that the client may desire to monitor. For example, the client may wish to monitor the frequency of access by the specified user of one or more social networks. As another example, the client may desire to monitor the duration of each access by the specified user of one or more social networks or the average duration of all accesses by the specified user of one or more social networks. Other usage statistics will occur to those skilled in the art, and such other usage statistics and definitions thereof are contemplated by this disclosure. In any case, such usage statistics identified and established by the client are made available to the client for review in the form of a report, for example by visiting a web-based client report application. Usage statistics detected and determined by the social network activity monitor service may or may not cause the social network monitor service to generate and send to the client a corresponding alert identifying the usage statistics.

From step 76 the process 70 also advances to step 90 where the client may define a report format. The report format may illustratively be different for receiving alerts from the social network activity monitor service in response to detection of one or more of the specified monitoring criteria and for reviewing monitoring statistics by the client via, for example a web-based report viewing application executed by the social network activity monitor server 12. For both cases, however, the client may at step 90 establish a report format. For example, either report format may be set up to include only excerpts of detected monitoring criteria, contextual data in addition to detected monitoring criteria and/or associated data in addition to detected monitoring criteria, such as graphical information, sound bytes and the like. Other report types and definitions will occur to those skilled in the art, and such other report types and definitions are contemplated by this disclosure.

From step 90, the process 70 advances to step 92 where the client may select one or more methods for receiving notifications, e.g., alerts, from the social network activity monitor server 12 in response to detection of the occurrence on the one or more social networks of one or more monitored activities associated with the specified user. Examples include, but are not limited to, a client-accessible web-based report view application (web-page), e-mail, SMS, WAP, RSS and the like. Illustratively, the client may select one or a combination of these methods for receiving notifications from the social network activity monitor server 12. Other communication types and/or protocols will occur to those skilled in the art, and such other communication types and/or protocols are contemplated by this disclosure.

From step 90, the process 70 also advances to step 94 wherein the client may define a scoring engine. The scoring engine is configured to allow clients to compare generalized behavioral statistics of the specified monitored user against either the specified monitored user him/herself over time or against one or more other individuals or groups. For example, clients may wish to determine the total number of occurrences or incidences of a certain type of a specified user over a period of time, or to may wish to determine the total number of occurrences of a certain type as compared with the number of occurrences of that or another type of all other monitored users on a normalized basis. Other scoring types and definitions will occur to those skilled in the art, and such other scoring types and definitions are contemplated by this disclosure.

Figure 5:
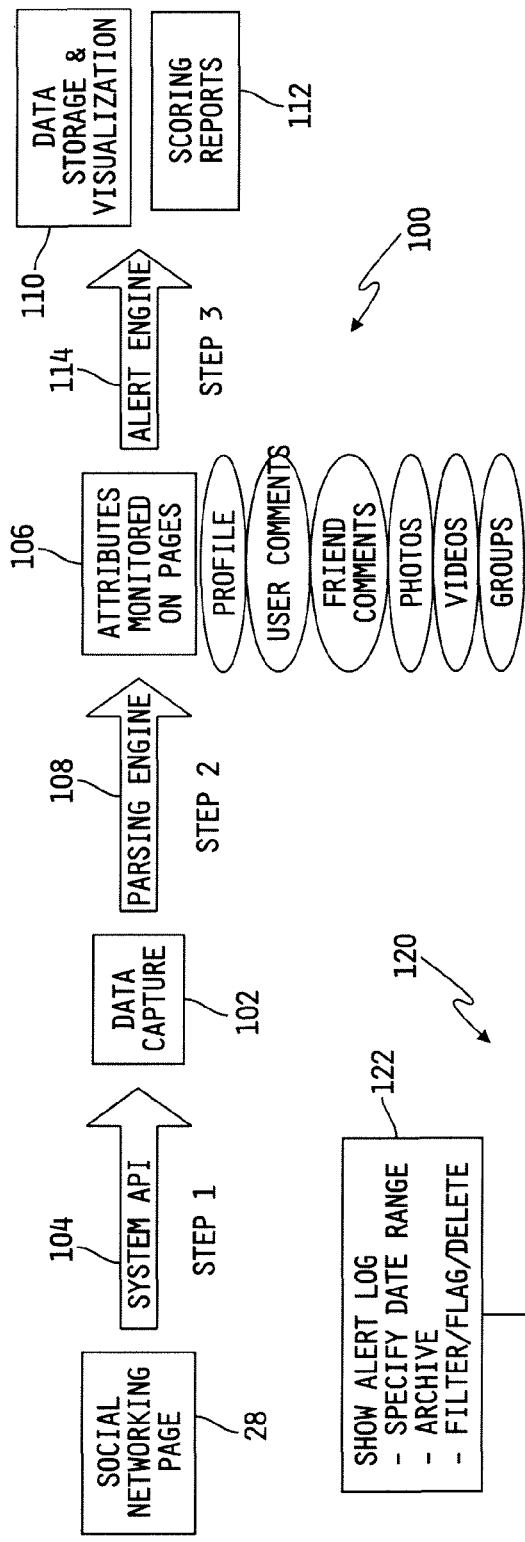
FIG. 5 is a flowchart of one illustrative process executed by the system of FIGS. 1 and 3 for monitoring activity of a specified user of an internet-based social network and reporting the monitored activity to a client of the internet-based social network monitoring system.

Referring now to FIG. 5, a flowchart is shown of one illustrative process 100 executed by the social network activity monitor server 12 of FIGS. 1 and 3 for monitoring specified activity of a specified user of an internet-based social network and reporting the monitored activity to a client of the social network monitoring service. The process 100 is illustratively stored in a memory of the parsing and alert generation server 50 of the social network activity monitor server 12 in the form of instructions that are executable by the parsing and alert generation server 50 to carry out the functional features of the process 100 as will be described hereinafter.

In the illustrated embodiment, the process 100 begins at step 102 where the parsing and alert generation server 50 accesses user pages of one or more social networks specified by clients $22_1$-$22_M$ via the APIs of the one or more social network sites and described hereinabove, and imports information that may contain attributes specified by clients $22_1$-$22_M$ as monitoring criteria or that may match training set content as specified by clients $22_1$-$22_M$ as monitoring criteria. Thereafter at step 106, a parsing engine 108 within the parsing and alert generation server 50 operates on the imported information and parses it to determine whether any of the imported information satisfies any monitoring criteria established by a client $22_1$-$22_M$. As described hereinabove, typical sources of information to be monitored in typical social network services include, but should not be limited to, a user's profile page, user comments, friend comments, photos, videos, groups and the like.

Illustratively, step 108 may include the trained content monitoring function described hereinabove with respect to FIG. 4. More specifically, the parsing engine within the parsing and alert generation server 50 may execute the classification algorithm to identify threat levels of the monitored activity based on the similarity of the monitored content to one or more pre-established monitoring criteria, i.e., based on previously tagged information. Such an algorithm provides for enhanced contextual analysis of content on the specified user's page of the specified social network over that which may be obtained only through keyword and/or key phrase detection. Detected threats may, for example, be reported to the client in a tiered manner depending upon the similarity of the detected content to pre-established monitoring criteria. In one illustrative example, which should not be considered to be limiting in any way, a tiered threat detection scheme of, for example, red/orange/yellow, may be employed such that the severity of detected threats, i.e., the similarity or closeness of the detected content to the pre-established monitoring criteria, may be identified and reported to the client in accordance with the example color scheme, e.g., wherein red is the highest threat level and yellow is the lowest. Other tiered threat detection schemes will occur to those skilled in the art, and any such alternate threat detection schemes are contemplated by this disclosure.

From step 106, the process 100 advances to step 110 where an alert engine 114 within the parsing and alert generation server 50 generates alerts based on satisfaction by the imported information of monitoring criteria established by a client 22$_1$-22$_M$, and passes such alerts to the central server farm 52. The central server farm 52, in turn, generates notifications based on the alerts and sends the notifications to the corresponding clients 22$_1$-22$_M$ according to the notification method selected by the clients 22$_1$-22$_M$. The central server farm 52 also logs all alerts and corresponding data, and makes such information available to the clients 22$_1$-22$_M$ in the form of reports summarizing and presenting according to formats selected by the clients 22$_1$-22$_M$. The clients may access such reports via, for example, a web-based application executed by the social network activity monitor server 12. From step 106, the process 100 also advances to step 112 where the alert engine 114 within the parsing and alert generation server 50 generates scoring reports based on the operation of the scoring engine described hereinabove with respect to FIG. 4.

Figure 6:
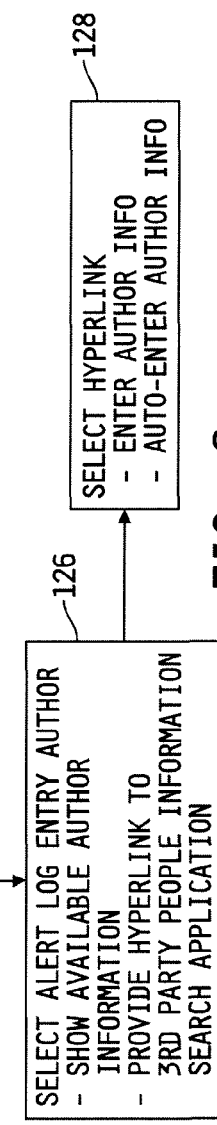
FIG. 6 is a flowchart of one illustrative process executed by the system of FIGS. 1 and 3 for reporting user activity monitoring results to a client of the internet-based social network monitoring system.

Referring now to FIG. 6, a flowchart is shown of one illustrative process 120 executed by the social network activity monitor server 12 of FIGS. 1 and 3 for reporting user activity monitoring results to a client of the internet-based social network monitoring service. The process 120 is illustratively stored in the database 54 of the central server farm 52 of the social network activity monitor server 12 in the form of instructions that are executable by the data processing servers 56 to carry out the functional features of the process 120 as will be described hereinafter.

In the illustrated embodiment, the process 120 controls an application, e.g., a web-based application, for reporting alerts and associated information to clients 22$_1$-22$_2$. As such the process 120 will be described in the context of acts executed by the data processing servers 56, some of which are in response to client instructions provided to the application via a conventional keyboard, point and click device or the like forming part of a device or system used by the client to access the application. The process 120 begins at step 122 where the data processing servers 56 displays, e.g., via a client-accessible web page, an alert log containing a number of alerts specific to one or more users specified by the client. The alert log illustratively has a date range that may be specified by the client, and further has an archive of alert logs that may be accessed by the client, and may further have an archive of filter settings, previously set flags and deleted items or items tagged for deletion. Thereafter at step 124, the data processing servers 56 display details of any specific log entry selected by the client. Illustratively, details of each log entry are expandable or contractible by the client to correspondingly show more or less information associated with each log entry. The log entries may, for example, display only excerpts of detected monitoring criteria, contextual data in addition to detected monitoring criteria and/or associated data in addition to detected monitoring criteria, such as graphical information, sound bytes and the like.

In one illustrative embodiment, authors of log entries may also be displayed, and clients may select at step 126 an author of any such log entry. In response to selection of an author of a log entry, the social network monitor server 12 is operable in one embodiment to display available author information. In this embodiment, available author information corresponds to that which is available via the particular social network from which the log entry was generated, and the author information displayed at step 126 may thus include any information about the author that is available via that particular social network. Alternatively or additionally, a hyperlink may be made available to the client which, if selected at step 128 automatically accesses a $3^{rd}$ party people information search application that the client may then use to further investigate the author of words or phrases on the specified user's page. Examples of $3^{rd}$ party person information search applications that may be accessed via the hyperlink include, but should not be limited to, http://www.pipl.com, http://search-for-people-online.com, http://www.peoplelookup.com, and the like.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A system for monitoring activity of a specified user of an internet-based social network by a client that is not the specified user, the internet-based social network including an application programming interface specific to the internet-based social network and a specified user's page established on the internet-based social network by the specified user, the system comprising:

a software application installed on a server controlling the internet-based social network and accessible by the specified user via the internet-based social network, the software application, when executed by the server controlling the internet-based social network, makes available via the application programming interface specific to the internet-based social network content relating to activity on the specified user's page or on a page of another user of the internet-based social network visited by the specified user, a client electronic device accessible by the client and configured to receive information via an internet link, and an activity monitor server separate from the server controlling the internet-based social network, the activity monitor server including a memory having instructions stored therein that are executable by the activity monitor server to monitor, via the application programming interface specific to the internet-based social network after the server controlling the internet-based social network has executed the software application, activity on the specified user's page or on the page of the other user of the internet-based social network visited by the specified user based on pre-established monitoring criteria, and to send a notification to the client electronic device via the Internet link when the monitored activity satisfies at least one criterion of the pre-established criteria, the pre-established monitoring criteria including at least one of one or more specified words and one or more specified phrases, the memory further having instructions stored therein that are executable by the activity monitor server to monitor activity on the specified user's page or on the page of the other user of the internet-based social network visited by the specified user by monitoring content displayed on the specified user's page or on the page of the other user of the internet-based social network visited by the specified user for occurrences on the specified user's page or on the page of the other user of the internet-based social network visited by the specified user of the at least one of the one or more specified words and the one or more specified phrases.

2. The system of claim 1 wherein the pre-established monitoring criteria further includes one or more specified authors of words or phrases, and wherein the memory further has instructions stored therein that are executable by the activity monitor server to monitor activity on the specified user's page or on the page of the other user of the internet-based social network visited by the specified user by monitoring content displayed on the specified user's page or on the page of the other user of the internet-based social network visited by the specified user for occurrences on the specified user's page or on the page of the other user of the internet-based social network visited by the specified user of one or more specified authors of words or phrases.

3. The system of claim 1 wherein the instructions that are executable by the activity monitor server to monitor activity on the specified user's page or on the page of the other user of the internet-based social network visited by the specified user include instructions to monitor activity on the specified user's page or on the page of the other user of the internet-based social network visited by the specified user for occurrences of one or more friend requests made by the specified user.

4. The system of claim 1 wherein the instructions that are executable by the activity monitor server to monitor activity on the specified user's page or on the page of the other user of the internet-based social network visited by the specified user include instructions to monitor activity on the specified user's page for occurrences of one or more friend acceptances made by the specified user.

5. The system of claim 1 wherein the instructions that are executable by the activity monitor server to monitor activity on the specified user's page or on the page of the other user of the internet-based social network visited by the specified user include instructions to monitor activity on the specified user's page for occurrences of one or more friend requests sent by another user of the internet-based social network to the specified user's page.

6. The system of claim 1 wherein the instructions that are executable by the activity monitor server to monitor activity on the specified user's page or on the page of the other user of the internet-based social network visited by the specified user include instructions to monitor activity on the specified user's page for occurrences of words or phrases on the specified user's page indicating that another user of the internet-based social network has accepted the specified user as a friend in response to a friend request made by the specified user.

7. The system of claim 1 wherein the instructions that are executable by the activity monitor server to monitor activity on the specified user's page or on the page of the other user of the internet-based social network visited by the specified user include instructions to monitor activity on the specified user's page for occurrences of words or phrases on the specified user's page indicating that the specified user has joined a social group within the social network.

8. The system of claim 1 wherein the instructions that are executable by the activity monitor server to monitor activity on the specified user's page or on the page of the other user of the internet-based social network visited by the specified user include instructions to monitor activity on the specified user's page for occurrences of words or phrases on the specified user's page indicating that the specified user has participated in one of a game, a contest and a survey made available to users of the social network.

9. The system of claim 1 wherein the instructions that are executable by the activity monitor server to monitor activity on the specified user's page or on the page of the other user of the internet-based social network visited by the specified user include instructions to monitor activity on the specified user's page for occurrences of words or phrases on the specified user's page indicative of one or more searches conducted by the specified user for other users within the social network or social groups within the social network.

10. The system of claim 1 wherein the memory has instructions stored therein that are executable by the activity monitor server to receive as data input from the client one or more specified notification receiving methods, and to use the one or more specified notification receiving methods to send the notification to the client electronic device.

11. The system of claim 10 wherein the one or more specified notification receiving methods include any of a client-accessible web page, e-mail, Short or Silent Messaging Service (SMS), Wireless Application Protocol (WAP), and Really Simple Syndication or Rich Site Summary (RSS) web feed format.

12. The system of claim 1 wherein the instructions that are executable by the activity monitor server to monitor activity on the specified user's page or on the page of the other user of the internet-based social network visited by the specified user further include instructions to provide on a client-accessible web page a hyperlink to a $3^{rd}$ party person information search application for investigation of authors of words or phrases on the specified user's page made other than by the specified user.

13. The system of claim 1 wherein the instructions that are executable by the activity monitor server to monitor activity on the specified user's page or on the page of the other user of the internet-based social network visited by the specified user include instructions to monitor activity on the specified user's page or on the page of the other user of the internet-based social network visited by the specified user for occurrences on the specified user's page or on the page of the other user of the internet-based social network visited by the specified user of content that matches at least one training set of content.

14. The system of claim 1 wherein the instructions that are executable by the activity monitor server to monitor activity on the specified user's page or on the page of the other user of the internet-based social network visited by the specified user include instructions to produce a score or rating of the monitored activity on a client-accessible web page that compares occurrence activities of the specified user against at least one of the occurrence activities of the specified user over time and of the occurrence activities of at least one other specified user being monitored.

15. The system of claim 1 wherein the client electronic device comprises one or more of a personal computer (PC), laptop PC, notebook PC, Tablet PC, Smartbook, Ultra-Mobile PC, Handheld PC, personal data or digital assistant (PDA), wireless mobile device and a smart phone.

16. The system of claim 1 wherein the internet-based social network is one or more of Facebook®, MySpace®, LinkedIn®, Twitter®, YouTube®, Flickr®, Nexopia, Bebo, Hi5, StudiVZ, iWiW, Tuenti, Decayenne, Tagged, XING, Badoo, Skyrock, Orkut, Hi5, Friendster, Mixi, Multiply, Orkut, Wretch, Xiaonei, Cyworld and Areapal.

17. A method for monitoring activity of a specified user of an internet-based social network by a client that is not the specified user, the internet-based social network including an application programming interface specific to the internet-based social network and a specified user's page established on the internet-based social network by the specified user, the method comprising:

pre-establishing, within an activity monitor server, monitoring criteria for monitoring activity on the specified user's page or on a page of another user of the internet-based social network visited by the specified user, the pre-established monitoring criteria including at least one of one or more specified words and one or more specified phrases, making a software application on a server controlling the internet-based social network accessible by the specified user via the internet-based social network, the software application, when executed by the server controlling the internet-based social network, makes available via the application programming interface specific to the internet-based social network content relating to activity on the specified user's page or on a page of another user of the internet-based social network visited by the specified user, establishing, via the activity monitor server, activity monitoring access to the specified user's page of the internet-based social network via the application programming interface specific to the internet-based social network by causing the software application to be executed by the server controlling the internet-based social network, after activity monitoring access to the specified user's page of the internet-based social network has been established, monitoring, via the activity monitor server, activity on the specified user's page or on the page of the other user of the internet-based social network visited by the specified user by monitoring content displayed on the specified user's page or on the page of the other user of the internet-based social network visited by the specified user for occurrences on the specified user's page or on the page of the other user of the internet-based social network visited by the specified user of the at least one of the one or more specified words and the one or more specified phrases, and notifying, via the activity monitor server, a client when the monitored activity satisfies at least one of the pre-established monitoring criteria.

18. The method of claim 17 wherein notifying a client comprises sending, via the activity monitor server and an internet link, notification information to at least one of a client-accessible web page and a client electronic device configured to receive the notification information via the internet link.

19. The method of claim 18 wherein sending the notification information to the client electronic device comprises sending the notification information via at least one of e-mail, a Short or Silent Messaging Service (SMS), a Wireless Application Protocol (WAP), and a Really Simple Syndication or Rich Site Summary (RSS) web feed format.

20. The method of claim 17 wherein the internet-based social network is one or more of Facebook®, MySpace®, LinkedIn®, Twitter®, YouTube®, Flickr®, Nexopia, Bebo, Hi5, StudiVZ, iWiW, Tuenti, Decayenne, Tagged, XING, Badoo, Skyrock, Orkut, Hi5, Friendster, Mixi, Multiply, Orkut, Wretch, Xiaonei, Cyworld and Areapal.

21. A system for monitoring activity of a specified user of an internet-based social network by a client that is not the specified user, the internet-based social network including an application programming interface specific to the internet-based social network and a specified user's page established on the internet-based social network by the specified user, the system comprising:

a software application installed on a server controlling the internet-based social network, the software application, when executed by the server controlling the internet-based social network, makes available via the application programming interface specific to the internet-based social network content relating to activity on the specified user's page or on a page of another user of the internet-based social network visited by the specified user, a client electronic device accessible by the client and configured to receive information via an internet link, and an activity monitor server separate from the server controlling the internet-based social network, the activity monitor server including a memory having instructions stored therein that are executable by the activity monitor server to monitor activity on the specified user's page or on a page of another user of the internet-based social network visited by the specified user based on pre-established monitoring criteria, and to send a notification to the client electronic device via the internet link when the monitored activity satisfies at least one criterion of the pre-established criteria, the memory further having instructions stored therein that are executable by the activity monitor server to act upon a request by the client to establish monitoring access to the specified user's page of the internet-based social network by making the software application available for execution by the specified user via the specified user's page of the internet-based social network.

22. The system of claim 21 wherein the instructions stored in memory further include instructions that are executable by the activity monitor server to make the software application available to the specified user based on pre-established identification information, provided to the activity monitor server by the client, which identifies the specified user within the internet-based social network.

23. The system of claim 21 wherein the instructions stored in memory further include instructions that are executable by the activity monitor server to retrieve from the memory the pre-established identification information previously stored therein by the client in the form of at least one of a name of the specified user's page within the internet-based social network and an identification name or code of the specified user's page within the internet-based social network.

24. The system of claim 21 wherein the client electronic device comprises one or more of a personal computer (PC), laptop PC, notebook PC, Tablet PC, Smartbook, Ultra-Mobile PC, Handheld PC, personal data or digital assistant (PDA), wireless mobile device and a smart phone.

25. The system of claim 21 wherein the internet-based social network is one or more of Facebook®, MySpace®, LinkedIn®, Twitter®, YouTube®, Flickr®, Nexopia, Bebo, Hi5, StudiVZ, iWiW, Tuenti, Decayenne, Tagged, XING, Badoo, Skyrock, Orkut, Hi5, Friendster, Mixi, Multiply, Orkut, Wretch, Xiaonei, Cyworld and Areapal.

* * * * *